US012785946B2

(12) United States Patent
Milheiro Mendes

(10) Patent No.: US 12,785,946 B2
(45) Date of Patent: Nov. 3, 2026

(54) QUANTUM KEY DISTRIBUTION (QKD) METHOD, QKD END-NODE AND QKD NETWORK

(71) Applicant: Airbus SAS, Blagnac (FR)

(72) Inventor: Paulo-Jorge Milheiro Mendes, Blagnac (FR)

(73) Assignee: Airbus SAS, Blagnac (FR)

( * ) Notice: Subject to any disclaimer, the term of this patent is extended or adjusted under 35 U.S.C. 154(b) by 110 days.

(21) Appl. No.: 18/772,648

(22) Filed: Jul. 15, 2024

(65) Prior Publication Data

US 2025/0038970 A1 Jan. 30, 2025

(30) Foreign Application Priority Data

Jul. 28, 2023 (EP) .................................... 23188376

(51) Int. Cl.
*H04L 29/06* (2006.01)
*G06F 21/00* (2013.01)
*H04L 9/08* (2006.01)

(52) U.S. Cl.
CPC .......... *H04L 9/0852* (2013.01); *H04L 9/0861* (2013.01)

(58) Field of Classification Search
None
See application file for complete search history.

(56) References Cited

U.S. PATENT DOCUMENTS

2012/0272053 A1* 10/2012 Brown .................. H04W 12/03 713/150
2021/0044433 A1* 2/2021 Hay ...................... H04L 9/0855
2023/0163960 A1* 5/2023 Stayskal ............... H04L 9/0852 380/278
2024/0178994 A1* 5/2024 Bedington ............ H04L 9/0869

FOREIGN PATENT DOCUMENTS

WO WO 202211731 * 6/2022
WO 2022182371 A1 9/2022

OTHER PUBLICATIONS

European Search Report for corresponding European Patent Application No. 23188376.0 dated Jan. 18, 2024.

* cited by examiner

*Primary Examiner* — Lisa C Lewis
(74) *Attorney, Agent, or Firm* — Greer, Burns & Crain, Ltd.

(57) ABSTRACT

A quantum key distribution, QKD, method, applied to a QKD end-node by locally generating a local key, and dividing the local key into a first local key part and a second local key part, receiving, via a ground-based first path, remote key information including an encrypted remote key generated by a remote, further QKD end-node. In addition, the method includes receiving, via a satellite-based second path, a first remote key part of the remote key and performing decryption on the remote key information using the first remote key part to obtain a second remote key part of the remote key. The method further comprises combining the second remote key part and the second local key part with (Continued)

each other to obtain a secret key. Also an end-node configured to perform such a method and a network with such an end-node.

15 Claims, 6 Drawing Sheets

QUANTUM KEY DISTRIBUTION (QKD) METHOD, QKD END-NODE AND QKD NETWORK

CROSS-REFERENCES TO RELATED APPLICATIONS

This application claims the benefit of European Patent Application Number 23188376-0 filed on Jul. 28, 2023, the entire disclosure of which is incorporated herein by way of reference.

FIELD OF THE INVENTION

The present invention relates to providing secure communication based on quantum key distribution (QKD), and in particular to quantum key distribution, QKD, methods, a quantum key distribution, QKD, end-node, a quantum key distribution, QKD, network, the use of the above for secure communication, and a computer-readable medium.

BACKGROUND OF THE INVENTION

Quantum key distribution (QKD) can ensure deployment of secure communication by leveraging quantum mechanics. However, a communication distance between QKD adjacent nodes is limited.

D. Elkouss, J. Martinez-Mateo, A. Ciurana, and V. Martin, Secure optical networks based on quantum key distribution and weakly trusted repeaters, Journal of Optical Communications and Networking 5, 316 (2013) describes repeaters, such as quantum relays, i.e. devices configured to forward quantum bits without measurement or cloning, to extend the communication distance.

Further, M. Peev et al., The secoqc quantum key distribution network in Vienna, New Journal of Physics 11, 075001 (2009) describes using trusted relays to extend the communication distance.

At the same time, however, security is crucial in a QKD network, which may be compromised, for example, if intermediate trusted relays betray or are cracked by attackers. In end-to-end key distribution, trusted relays have access to all the data that is transmitted. If a relay leaks information or is controlled by an attacker, all messages passing through the relay will not be secure anymore.

To achieve key distribution in the presence of untrusted nodes, previous solutions mainly focused on two approaches, namely using Measurement-Device Independent QKD (MDI-QKD) or Twin-Field QKD (TF-QKD). Although these approaches allow for reducing the number of trusted relays, they still require trusted relays to extend the QKD distance because they do not allow direct connection of two untrusted nodes.

H.-K. Lo, M. Curty, and B. Qi, Measurement-device-independent quantum key distribution, Phys. Rev. Lett. 108, 130503 (2012) relates to MDI-QKD.

G.-J. Fan-Yuan, F.-Y. Lu, 8. Wang, Z.-Q. Yin, D.-Y. He, W. Chen, 2. Zhou, Z.-H. Wang, J. Teng, G.-C. Guo, et al., Robust and adaptable quantum key distribution network without trusted nodes, Optica 9, 812 (2022) relates to MDI-QKD.

M. Lucamarini, Z. L. Yuan, J. F. Dynes, and A. J. Shields, Overcoming the rate-distance limit of quantum key distribution without quantum repeaters, Nature 557, 400-403 (2018) relates to TF-QKD.

Another approach to improve QKD networks in terms of resisting untrusted nodes is based on multipath key distribution. However, this approach requires x+1 disjoint path to prevent x relay nodes from e.g. eavesdropping information.

H. Zhou, K. Lv, L. Huang, and X. Ma, Quantum network: Security assessment and key management, IEEE/ACM Transactions on Networking 30, 1328-1339 (2022) relates to such multipath key distribution.

Another approach relies on a satellite network to deploy a QKD network, in which the satellite is a trusted node between non-adjacent ground nodes. However, in this approach, the satellite knows two intermediate keys used, and therefore the final key.

Bruno Huttner et al., Long-range QKD without trusted nodes is not possible with current technology, npj quantum information, September 2022, relates to such satellite network.

In view of the above, it would be beneficial if there is a reliable method, apparatus, network, or the like for enabling QKD for secure communication even over a distance that may rely on using one or more untrusted intermediate nodes.

SUMMARY OF THE INVENTION

This demand is met by one or more embodiments of the present invention described herein.

According to a first aspect, there is provided a quantum key distribution (QKD) method. The method is applied to a QKD end-node. The method comprises locally generating a local key, and dividing the local key into a first local key part and a second local key part. The method further comprises receiving, via a ground-based first path, remote key information including an encrypted remote key generated by a remote, further QKD end-node. In addition, the method comprises receiving, via a satellite-based second path, a first remote key part of the remote key. Further, the method comprises performing decryption on the remote key information using the first remote key part to obtain a second remote key part of the remote key. The method further comprises combining the second remote key part and the second local key part with each other to obtain a secret key.

The present disclosure provides a reliable solution for enabling QKD for secure communication even over a distance that may rely on using one or more untrusted intermediate nodes. While previous solutions required ground devices to be in the line-of-sight of a satellite of a QKD network limiting the accessible distance range on the surface of the earth to typically 1000 km, the proposed solution enables distance of more than 1000° km, so that long-distance communication is possible. Further, the proposed solution allows deployment of a QKD network among a set of untrusted QKD nodes and/or non-QKD nodes. Also, this solution allows two QKD devices, e.g. QKD end-nodes, to share a secret key created within that QKD system, while all the other nodes in the path, i.e. the first path, arranged between the two QKD devices are not aware of the secret key used. In other words, the proposed solution makes use of two paths, i.e. the first and the second path, wherein none of these paths has access to the secret key that may be used for an end-to-end communication. Further, the proposed solution does not require a quantum satellite. Rather, a satellite used in the second path may also be a regular satellite, e.g. using bent-pipe communication. In addition, the proposed solution does not require deployment of QKD nodes in all elements of the path, particularly of the first path, allowing for faster deployment of a QKD network at lower costs. Also, the proposed solution does not require deployment of third-party quantum devices, such as a quantum computer or the like, to generate the secret key to use in the end-to-end communication.

As used herein, quantum key distribution (QKD) may be understood as a secured communication method that relies on a cryptographic protocol involving components of quantum mechanics. QKD may be used to generate, produce, etc. and distribute a key, i.e. the secret key. In this way, the secret key may be shared among two devices, e.g. end-devices, end-nodes, particularly QKD end-nodes, or the like, and/or applications or the like running on those devices, etc. This secret key may then be used with any suitable and/or chosen encryption algorithm to encrypt and decrypt a message, data, or the like to be transmitted between the two devices, etc., i.e. to provide secure end-to-end communication. Due to the encryption using the secret key, the encrypted messages, data, etc. may be transmitted over a standard communication channel without compromising security.

Accordingly, the above method may be applied to both such end-devices, i.e. QKD end-nodes. The further QKD end-node may also be referred to as second QKD end-node. The local key of one QKD end-node, i.e. a first QKD end-node, may be understood as the remote key of the respective other QKD end-node, i.e. a second QKD end-node, and vice versa. However, the underlying principle of obtaining the secret key remains the same, and as a result both have a shared and/or common secret key when the method is carried out.

Further, as used herein, a QKD node, such as a QKD end-node, a QKD neighbor-node, and/or a QKD intermediate node, may be implemented based on any suitable QKD protocol, wherein BB84 or BB92 are merely examples and the solution described herein may also be used with other QKD protocols. At least some of the QKD nodes may comprise a quantum channel and a classical channel. In contrast thereto, a non-QKD node may comprise only a classical channel, and may also be referred to as a classic node. In addition, the QKD end-nodes are to share the same secret key. The QKD end-nodes may be associated with a respective application or the like requiring and/or requesting secure end-to-end communication. Using the shared secret key at both QKD end-nodes, and/or at both applications etc., for encryption/decryption allows secure end-to-end communication. Further, the QKD end-node(s) may be either sender or receiver of the local key, remote key, remote key information, local key information, etc., depending on which part of the whole QKD procedure is considered. In particular, each QKD end-node generates its own local key and processes it in the same way for sending a part of the local key via the second path or local key information to the respective other QKD end-node. Likewise, each QKD end-node receives from the respective other QKD end-node a part of a correspondingly generated remote key, which may also be referred to as another local key that has been generated remotely, and corresponding remote key information.

Further, by way of example, the local key may be a quantum key. It may be locally-generated by using quantum computer or the like. In at least some embodiments, the end-node may generate the local key using a local quantum channel that may be established with a QKD neighbor-node or the like. It is noted that dividing a key into two parts may be understood as forming two halves, or as any other suitable division.

As used herein, "remote key information" and/or "local key information" may be understood as key-related information that includes the respective key in only encrypted form, so that the key cannot be accessed without decryption. That is, there is no element, e.g. any node, of the first path that could be aware of the respective complete remote key and/or local key, as this is only transmitted in encrypted form. For encrypting the respective local key and/or remote key, any suitable encryption algorithm may be used, provided that this may be decrypted on the respective receiver side on the basis of the received key information. Merely by way of example, reference is made to additive ciphers. As an illustrative example, a XOR cipher may be used. Thereby, the remote key information and/or local key information may be generated by performing a corresponding XOR operation on the first local key part and the second local key part, or the first remote key part and second remote key part respectively, to obtain the respective local key information and/or remote key information. With the knowledge of the second remote key part, i.e. the local key part of the respective sending QKD end-node, received via the second path, a corresponding XOR-operation may be performed on the received remote key information and the first remote key part to obtain the second remote key part of the remote key. For example, this XOR-operation may be performed bit-by-bit.

The combining the second remote key part and second local key part with each other may be understood as any suitable processing, operation, or the like capable of generating the desired secret key. For example, this may include one or more mathematical or computational operations, concatenating the second key parts, or the like.

Further, as used herein, the first path may include a number of nodes arranged between the two QKD end-nodes, formed as e.g. QKD neighbor-nodes, QKD intermediate, nodes, or non-QKD nodes. Thereby, the number of nodes may be an integer equal or greater than 1. The number of nodes may be arranged successively along the first path. A QKD neighbor-node may be understood as QKD node that is arranged directly adjacent to the QKD end-node. A QKD intermediate-node may be understood as a QKD node that is arranged not directly adjacent to the QKD end-node, but may be adjacent to the QKD neighbor-node. The non-QKD node may comprise only a classical channel to other, adjacent nodes but no quantum channel.

The satellite may be a classical satellite, e.g. a regular bent-pipe satellite. It may provide coverage to all QKD nodes deployed on the ground, e.g. in the first path. The second path may comprise only one satellite, wherein configurations comprising multiple satellites may also be conceivable.

According to an embodiment, the secret key may be provided to a local application, or any other requesting entity associated with the QKD end-node and/or further QKD end-node, for establishing secure communication to a corresponding remote application of the further QKD end-node using the secret key. In other words, the secret key obtained at each QKD end-node may be made available for establishing secure communication with encryption (and corresponding decryption) of messages, data, or the like, to be transmitted therebetween.

In an embodiment, the locally generating of the local key may comprise generating the local key as a quantum key by using a local quantum channel with a QKD-neighbor-node arranged adjacent to the QKD end-node in the first path. Thereby, the QKD neighbor-node may be different from the further end-node. For example, the QKD end-node and its adjacent neighbor-node may have established a local quantum channel. Using this local quantum channel, the respective local key may be generated.

According to an embodiment, the method may further comprise performing encryption on the first local key part and the second local key part to obtain local key information including the encrypted local key. Further, the method may comprise providing the local key information via the first path. As explained above, the local key information may also be referred to as the remote key information when considered from the further QKD end-node's perspective. As mentioned above, the encryption may be performed by any suitable encryption algorithm. However, as an illustrative example, the above-mentioned XOR operation may be performed.

In an embodiment, the local key information may be provided via a classical channel of the first path. As the local key information, also be referred to as the remote key information when considered from the further QKD end-node's perspective, itself is encrypted, it may be transmitted over a classic network without compromising security.

According to an embodiment, the method may further comprise providing the first local key part via the second path. As merely a part of the local key is transmitted, security is not compromised if the satellite is untrusted.

In an embodiment, the first local key part may be provided via a classical channel of the second path. As merely a part of the local key is transmitted, it may be transmitted over a classic network without compromising security.

According to an embodiment, the first local key part may be provided after elapse of a random interval of time from or after providing the local key information. The parts of the keys transmitted may be marked as related, for example, by a common index or the like. Waiting for the interval of time further increases security in the most unlikely event that both paths would be compromised.

According to second aspect, there is provided a quantum key distribution (QKD) method that is applied to a QKD network comprising a first QKD end-node and a second QKD end-node arranged remotely from the first QKD end-node. The method comprises obtaining, by the first QKD end-node, a secret key by carrying out the method of the first aspect, wherein the first QKD end-node acts as the QKD end-node and the second QKD end-node acts as the remote QKD end-node. Further, the method comprises obtaining, by the second QKD end-node, the secret key by carrying out the method of the first aspect, wherein the second QKD end-node acts as the QKD end-node and the first QKD end-node acts as the remote QKD end-node.

As described above, the method according to the first aspect may be applied to each of two QKD end-nodes. This allows to obtain the same secret key at both QKD end-nodes. As a result, e.g. an application associated with the respective QKD end-nodes may use the secret key that is common to both QKD end-nodes to establish secure communication to each other using the secret key.

According to a third aspect, there is provided a quantum key distribution (QKD) end-node. The QKD end-node comprises a first interface circuitry configured to receive, via a ground-based first path, remote key information including an encrypted remote key generated by a remote, further QKD end-node. Further, the QKD end-node comprises second interface circuitry configured to receive, via a satellite-based second path, a first remote key part of the remote key. In addition, the QKD end-node comprises processing circuitry that is configured to locally generate a local key, and divide the local key into a first local key part and a second local key part. The processing circuitry is further configured to perform decryption on the remote key information using the first remote key part to obtain a second remote key part of the remote key. In addition, the processing circuitry is configured to combine the second remote key part and the second local key part with each other to obtain a secret key.

The propose QKD end-node may be configured to carry out the method of the first aspect. Therefore, reference is additionally made to the first aspect.

For example, the first interface circuitry may be a hardware interface comprising a port or the like for coupling to optical fibers and/or establishing a quantum channel. Further, for coupling with a classical channel, the first interface circuitry may comprise a corresponding network port or the like. By way of example, the second interface circuitry may comprise a satellite transceiver or the like.

Further, by way of example, the processing circuitry may be implemented using one or more of an application specific integrated circuit (ASIC), a field programmable gate array (FPGA), a processor executing software, a microprocessor, a CPU, or other circuitry. The processing circuitry is coupled with the hf transceiver. Further, the processing circuitry is coupled with the at least one network interface. The processing circuitry may also be coupled to other components of the software-defined radio, such as a power supply, a memory, or the like. The functionalities, operations, methods, etc. of the processing circuitry described herein may be implemented by corresponding instructions, such as computer program instructions, or the like. These instructions may be stored in a memory of the software-defined radio that may be coupled to the processing circuitry. Executing the instructions by the processing circuitry may cause the processing circuitry to perform the functionalities, operations, methods, etc. described herein. The processing circuitry may be operated using an operating system, such as Linux or the like.

According to a fourth aspect, there is provided a quantum key distribution (QKD) network. The QKD network comprises a first QKD end-node according to the third aspect. Further, the network comprises a second QKD end-node according to the third aspect, arranged remotely from the first QKD end-node. The QKD network further comprises a first QKD neighbor-node arranged in the first path adjacent and connected to the first QKD end-node. In addition, the QKD network comprises a second QKD neighbor-node arranged in the first path adjacent and connected to the second QKD end-node. Thereby, the first QKD neighbor-node and the second QKD neighbor-node each have a respective quantum channel with the respective first QKD neighbor-node or second QKD neighbor-node to generate the respective local key.

The QKD network may be configured to carry out the methods according to the first aspect and/or the second aspect, so that reference is made to the first and second aspect.

According to an embodiment, the QKD network may further comprise a number of QKD or non-QKD intermediate-nodes successively arranged along the first path between the first QKD neighbor-node and the second QKD neighbor-node. Thereby, each of the number of QKD or non-QKD intermediate-nodes may be configured to pass on the remote key information and/or local key information to a next one of the number of QKD or non-QKD intermediate-nodes towards the respective first QKD end-node or second QKD end-node via a classical channel.

In an embodiment, each of the number of QKD or non-QKD intermediate-nodes may be configured to individually decrypt and encrypt the remote key information and/or local key information and pass it on along the first path. For example, each QKD intermediate-node and/or QKD neighbor-node, and/or non-QKD (intermediate) node, may be configured to decrypt the key information received from the preceding node and to encrypt the key information again and transmit it to the next, subsequent QKD node. The respective transmission between the nodes may be carried out via a classical channel.

According to an embodiment, the QKD network may include the Satellite used in the second path. However, since this may be a regular satellite, it may also be provided by third parties and does not necessarily have to be part of the QKD network itself.

A fifth aspect relates to the use of the QKD methods, QKD end-nodes, QKD networks according to any one of the first to fourth aspect to obtain a secret key and establish secure end-to-end communication between two QKD end-nodes using the secret key. As described herein, the secret key is respectively obtained at both ends of the end-to-end communication. The secure communication may be established via a classical channel, as the communication is encrypted using the secret key. The present disclosure can be used even with a set of untrusted intermediate nodes, as the secret key is not leaked thereto.

According to a sixth aspect, a computer-readable medium having stored thereon a computer program comprising instructions to cause processing circuitry of a quantum key distribution (QKD) end-node to carry out the method according to the first aspect, and/or to carry out the method according to the second aspect.

The embodiments and improvements above can be combined in any reasonable way. Further embodiments, improvements, and implementations of the present invention further comprise combinations of previously or subsequently mentioned features of the present invention even if said combinations have not been explicitly mentioned. In particular, a person skilled in the art will add single features to the respective base aspects of the invention.

BRIEF DESCRIPTION OF THE DRAWINGS

The present invention is explained in more detail below with reference to the embodiments shown in the schematic figures.

Figure 1:
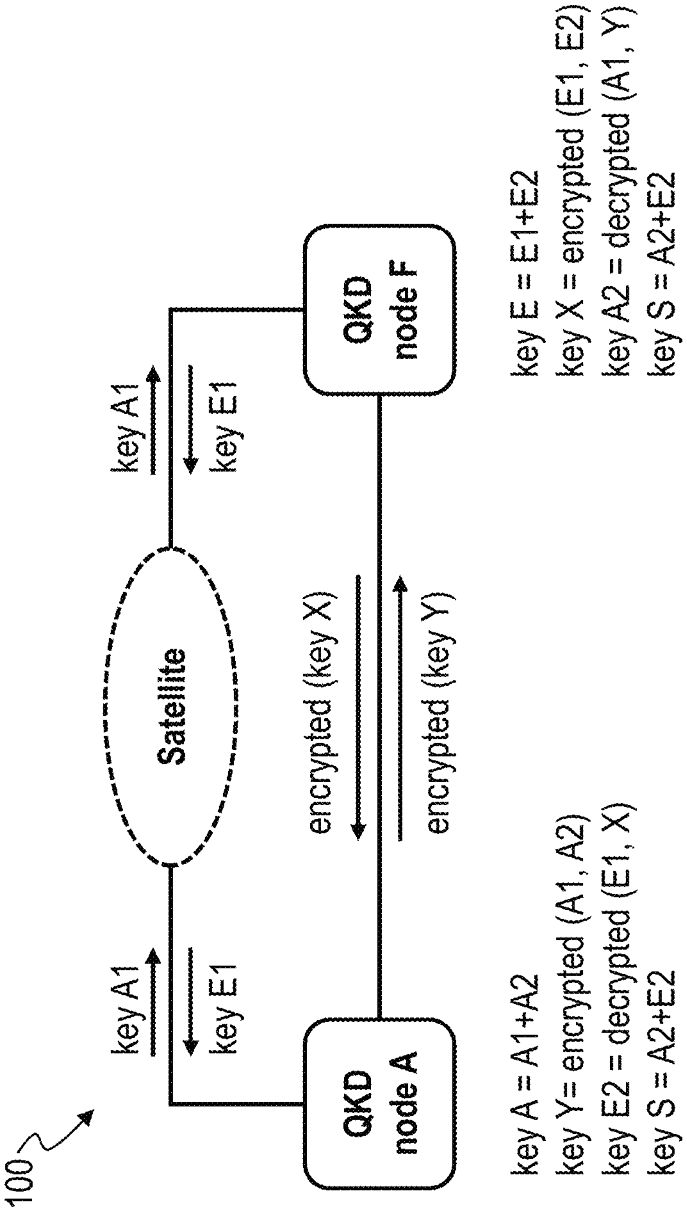
FIG. 1 illustrates in a block diagram an exemplary quantum key distribution (QKD) network according to an embodiment.

The drawings shown here are meant to impart an extended understanding of the embodiments of the present invention. They illustrate embodiments and serve in conjunction with the description to explain principles and concepts of the present invention. Further embodiments and a number of the stated advantages are revealed in view of the drawings. The features of the drawings are not necessarily shown to scale.

In the figures of the drawing, elements, features and components which are identical, functionally identical and of identical action are denoted in each case by the same reference designations unless stated otherwise.

DETAILED DESCRIPTION OF THE PREFERRED EMBODIMENTS

FIG. 1 illustrates in a block diagram an exemplary quantum key distribution (QKD) network 100. The QKD network 100 comprises a first QKD end-node denoted as "QKD Node A", and a second QKD end-node denoted as "QKD Node F" arranged remotely from QKD Node A. QKD Node A and QKD Node F are connected to each other via a first path that is ground-based, and a second path that is satellite-based.

QKD Node A and the QKD Node F are configured to perform the operations described below, which are basically the same at both ends, but with correspondingly inverted key information used.

Referring first to QKD Node A, this is configured to locally generate a local key A and to divide the local key A into a first local key part A1 and a second local key part A2. Further, QKD Node A is configured to receive, via the first path, remote key information X that includes an encryption of a remote key E generated by QKD Node F. In addition, QKD Node A is configured to receive, via the second path, a first remote key part E1 of the remote key E. QKD Node A is further configured to perform decryption on the remote key information X using the first remote key part E1 to obtain a second remote key part E2 of the remote key E. Further, QKD Node A is configured to combine the second remote key part E2 and the second local key part A2 with each other to obtain a secret key S.

Likewise, now referring to QKD Node F, this is configured to locally generate a local key E and to divide the local key E into a first local key part E1 and a second local key part E2. Further, QKD Node F is configured to receive, via the first path, remote key information Y that includes an encryption of a remote key A generated by QKD Node A. It is understood that the remote key A corresponds to the above local key A, when considered from QKD Node A's perspective. In other words, QKD Node A is now the remote QKD node for QKD Node F, and vice versa. In addition, QKD Node F is configured to receive, via the second path, a first remote key part A1 of the remote key A. QKD Node F is further configured to perform decryption on the remote key information Y using the first remote key part A1 to obtain a second remote key part A2 of the remote key A. Further, QKD Node F is configured to combine the second remote key part A2 and the second local key part E2 with each other to obtain the secret key S, which is the same as obtained by QKD Node A as described above.

In this way, both QKD Node A and QKD Node F, i.e. the QKD end-nodes of the QKD network 100, share the same secret key S. This secret key S may then be used by e.g. an application associated with QKD Node A and QKD Node F to establish a secure, encrypted communication, respectively using the secret key S for encryption and decryption.

In summary, the following keys are used and/or generated in the QKD network 100. Local key A is locally generated by QKD node A and then divided into two local key parts A1 and A2. Local key A may also be referred to as the remote key as received by QKD node F. Likewise, local key E is locally generated by QKD node F and then divided into two local key parts E1 and E2. Local key E may also be referred to as the remote key as received by QKD node A. Key Y is generated by QKD node A and includes an encryption of local key A. Key X is generated by QKD node F and includes an encryption of local key E. Key (part) E2 is obtained by QKD node A by decrypting key X using key part E1. Key (part) A2 is obtained by QKD node F by decrypting key Y using key part A1. The respective key S, which is the same for QKD node A and QKD node F, is obtained by combining the respective second key parts, i.e. key parts A2 and E2, with each other.

Figure 2:
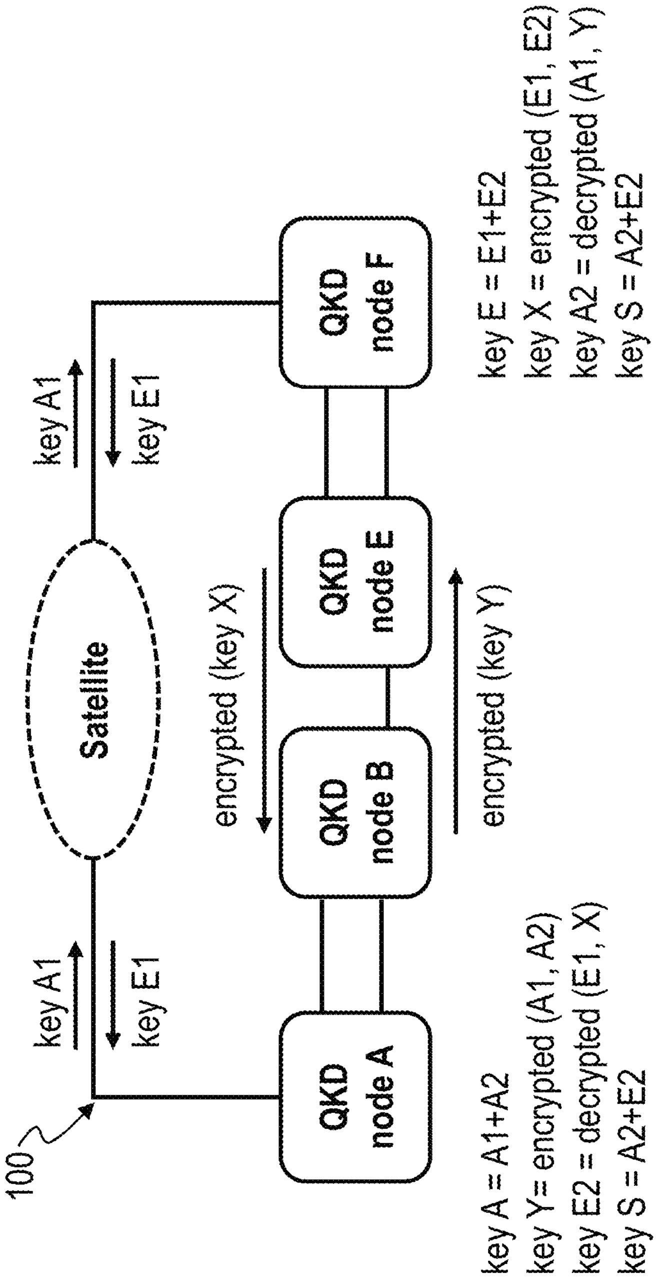
FIG. 2 illustrates in a block diagram an exemplary quantum key distribution (QKD) network according to an embodiment.

FIG. 2 illustrates another exemplary configuration of the QKD network 100. Again, there are the above QKD Node A and QKD Node F serving as QKD end-nodes. In addition, there is provided a first QKD neighbor-node denoted as "QKD node B", and a second QKD neighbor-node denoted as "QKD node E". QKD node B is arranged adjacent, i.e. subsequent, to QKD node A in the first path, and connected thereto via a quantum channel and a classical channel, each indicated in FIG. 2 by a respective connecting solid line. Likewise, QKD node E is arranged adjacent, i.e. preceding, to QKD node F in the first path, and connected thereto via a quantum channel and a classical channel, each indicated in FIG. 2 by a respective connecting solid line.

While in the QKD network 100 according to FIG. 1, the local key A and/or local key E may be generated by e.g. a quantum computer or any other suitable quantum key generation mechanism, in the QKD network 100 according to FIG. 2, each of QKD node A and QKD node F is configured to generate the respective local key A or local key E as a quantum key by using the local quantum channel with the respective QKD node B or QKD node E, i.e. QKD neighboring-node.

QKD node B and QKD node E may be directly connected to each other by a classical channel, or may be indirectly connected via a number of further nodes, such as QKD intermediate-nodes, or non-QKD (intermediate) nodes, each of which forms a hop within the first path.

Figure 3:
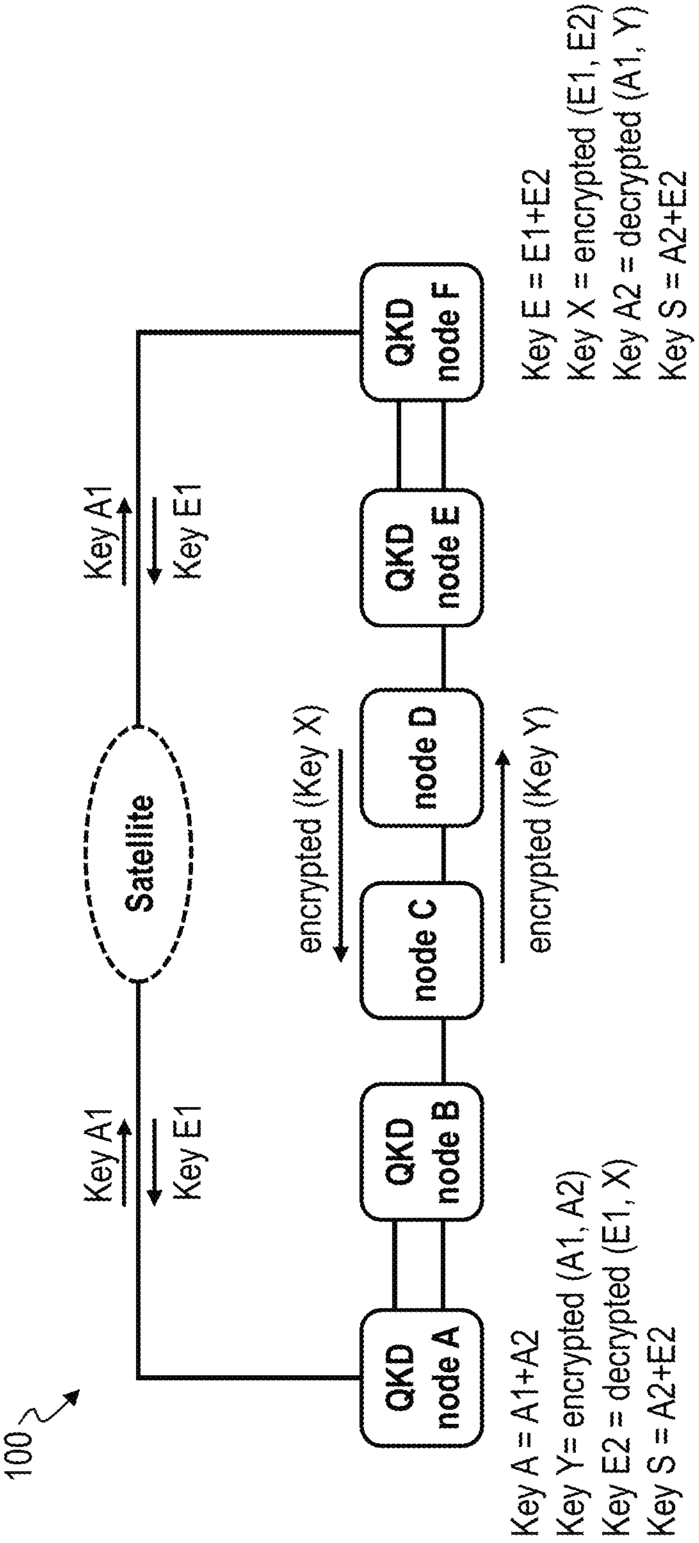
FIG. 3 illustrates in a block diagram an exemplary quantum key distribution (QKD) network according to an embodiment.

FIG. 3 illustrates yet another exemplary configuration of the QKD network 100. Again, there are the above QKD Node A and QKD Node F serving as QKD end-nodes, and QKD node B and QKD node E. In addition, there is provided a first intermediate-node denoted as "node C", and a second intermediate-node denoted as "node D". Node C is arranged adjacent, i.e. subsequent, to QKD node B in the first path, and connected thereto via a classical channel, indicated in FIG. 3 by a respective connecting solid line. Likewise, Node D is arranged adjacent, i.e. preceding, to QKD node E in the first path, and connected thereto via a classical channel, indicated in FIG. 3 by a connecting solid line. Node C and node D are connected to each other by a classical channel, indicated in FIG. 3 by a connecting solid line. For example, node C and node D may be non-QKD nodes, or may be QKD-nodes, and may also be referred to as intermediate nodes.

Accordingly, in this exemplary configuration the QKD network 100 comprises more hops than in the above configurations. As key X and key Y each include encrypted information, i.e. an encryption of the respective key A or key E, QKD node A and QKD node F may exchange those keys X and Y respectively via a classical network.

Figure 4:
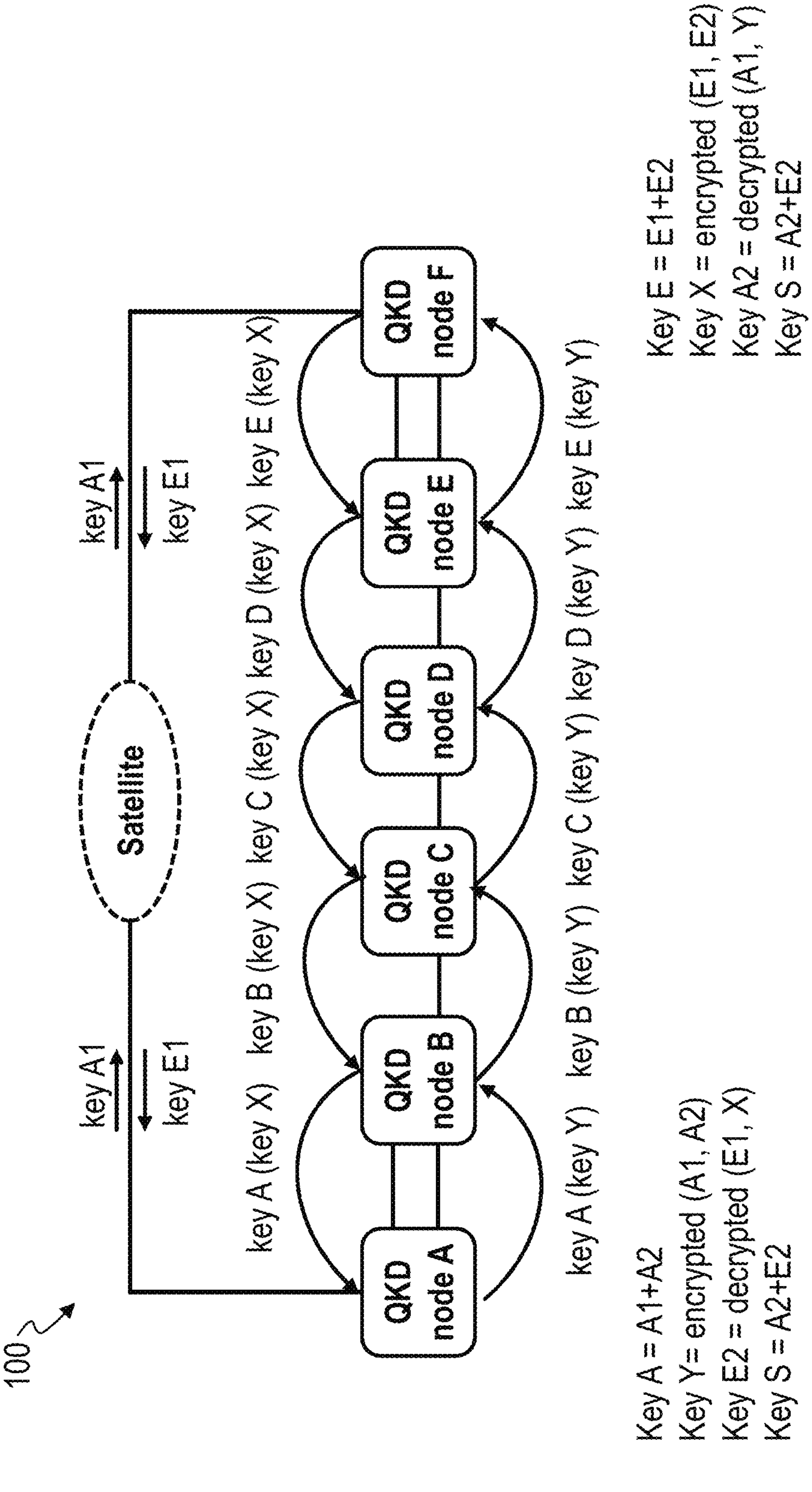
FIG. 4 illustrates in a block diagram an exemplary quantum key distribution (QKD) network according to an embodiment.

FIG. 4 illustrates another exemplary implementation of the QKD network 100. Here, node C and node D are each configured as a QKD node. Further, each of the number of QKD intermediate-nodes and/or at least one QKD neighbor-node, i.e. QKD node B, QKD node C, QKD node D, and QKD node E, is configured to individually decrypt and encrypt the respective remote key information X and Y and/or respective local key information and pass it on along the first path. For example, each QKD intermediate-node and/or QKD neighbor-node may be configured to decrypt the key information received from the preceding node and to encrypt the key information again and transmit it to the next, subsequent QKD node. The respective transmission between the nodes may be carried out via a classical channel. The respective encryption may be generated by using the quantum channel established with the respective adjacent and/or neighboring node.

In other words, each intermediary node, i.e. QKD nodes B, C, D and E, perform the same operation of decrypting the respectively transmitted key x or key Y from the classical channel from the previous neighbor, and encrypting the respective key X or key Y to be transmitted in the classical channel to the next neighbor, thereby further enhancing security. The respective encryption may be generated by using the quantum channel established with the respective adjacent and/or neighboring node.

Figure 5:
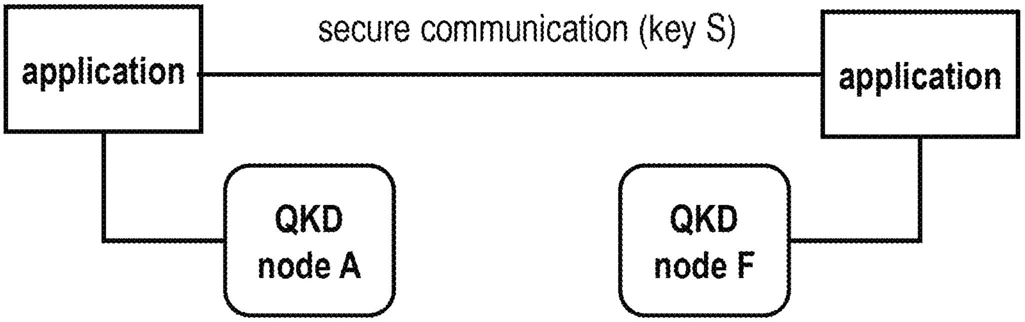
FIG. 5 illustrates in a block diagram an exemplary application scenario of the quantum key distribution (QKD) according to an embodiment.

FIG. 5 illustrates an exemplary application scenario for the secret key S obtained in each of QKD node A and QKD node F. As described herein, the secret key S commonly obtained at both ends may be provided to, for example, an application associated with the respective QKD node A and/or QKD node F. Each application may be configured to use the secret key S to establish a secure communication with encryption.

Figure 6:
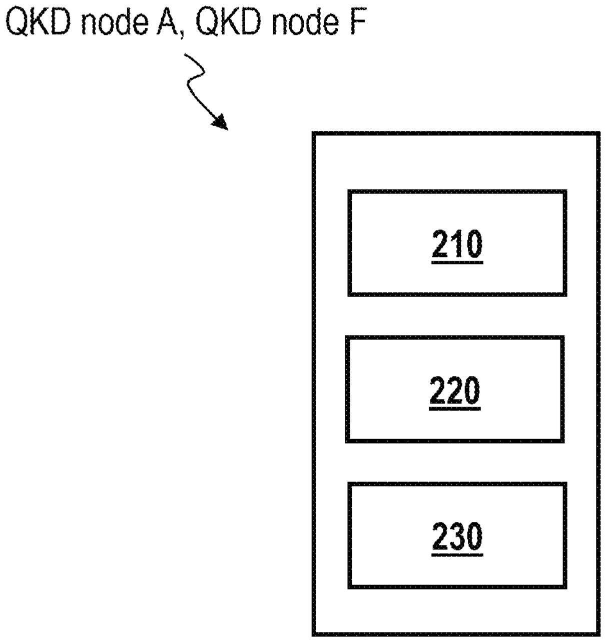
FIG. 6 illustrates schematically an exemplary configuration of a quantum key distribution (QKD) end-node.

FIG. 6 illustrates in a block diagram an exemplary configuration of QKD end-node, e.g. QKD node A and/or QKD node F.

Accordingly, QKD node A and/or QKD node F comprises first interface circuitry 210 configured to receive, via a ground-based first path, remote key information including an encrypted remote key generated by a remote, further QKD end-node. Further, QKD node A and/or QKD node F comprises second interface circuitry 220 configured to receive, via a satellite-based second path, a first remote key part of the remote key. In addition, QKD node A and/or QKD node F comprises processing circuitry 230 that is configured to locally generate a local key, and divide the local key into a first local key part and a second local key part, to perform decryption on the remote key information using the first remote key part to obtain a second remote key part of the remote key, and to combine the second remote key part and the second local key part with each other to obtain a secret key. The first interface circuitry 210, the second interface circuitry 220 and the processing circuitry 230 may be operatively and/or communicatively coupled to each other.

Figure 7:
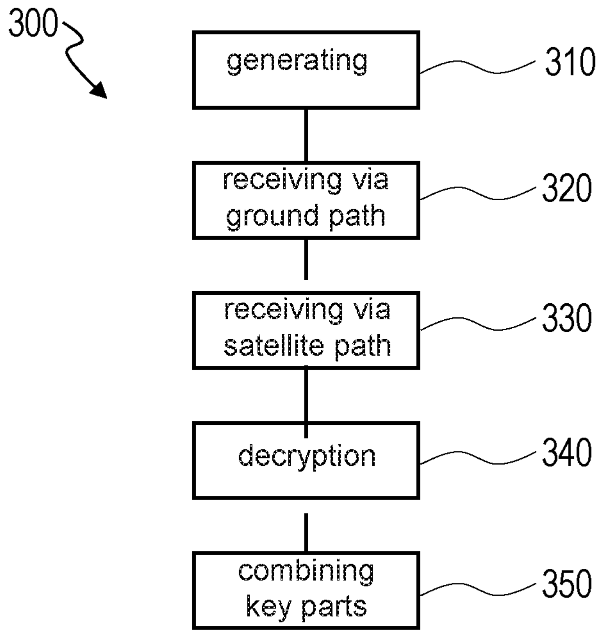
FIG. 7 illustrates in a flow chart a quantum key distribution (QKD) method according to an embodiment.

FIG. 7 illustrates in a flow chart a quantum key distribution, (QKD) method 300. The method 300 is applied to a QKD end-node, e.g. QKD node A and/or QKD node F.

The method comprises locally generating 310 a local key, e.g. local key and/or local key E, and dividing the local key into a first local key part and a second local key part. Further, the method 300 comprises receiving 320, via a ground-based first path, remote key information, e.g. remote key information X and/or remote key information Y, including an encrypted remote key generated by a remote, further QKD end-node. In addition, the method 300 comprises receiving 330, via a satellite-based second path, a first remote key part, e.g. remote key part A1 and/or remote key part E1, of the remote key. Furthermore, the method 300 comprises performing 340 decryption on the remote key information using the first remote key part to obtain a second remote key part of the remote key. In addition, the method 300 comprises combining 350 the second remote key part and the second local key part with each other to obtain a secret key, e.g. secret key S.

Figure 8:
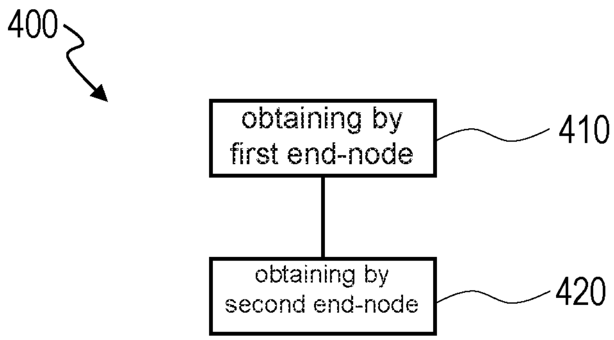
FIG. 8 illustrates in a flow chart a quantum key distribution (QKD) method according to an embodiment.

FIG. 8 illustrates in a flow chart a quantum key distribution, (QKD) method 400. The method 300 is applied to a to a QKD network, e.g. QKD network 100.

The method 400 comprises obtaining 410, by the first QKD end-node, e.g. QKD node A and/or QKD node F, a secret key by carrying out the above method 300, wherein the first QKD end-node acts as the QKD end-node and the second QKD end-node acts as the remote QKD end-node. Further, the method 400 comprises obtaining 420, by the second QKD end-node, e.g. QKD node A and/or QKD node F, the secret key, e.g. secret key S, by carrying out the above method 300, wherein the second QKD end-node acts as the QKD end-node and the first QKD end-node acts as the remote QKD end-node.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

- 100 quantum key distribution (QKD) network
- QKD node A QKD end-node
- QKD node F QKD end-node
- QKD node B QKD neighbor-node
- QKD node E QKD neighbor-node
- (QKD) node C QKD or non-QKD intermediate node
- (QKD) node D QKD or non-QKD intermediate node
- key A, key E local key and/or remote key
- key A1, key E1 first local key part and/or first remote key part
- key A2, key E2 second local key part and/or second remote key part
- key X, key Y key with encryption of key A (e.g. A1+A2) and/or key E (E1+E2)
- key S secret key
- 210 first interface circuitry
- 220 second interface circuitry
- 230 processing circuitry
- 300 method
- 400 method

The invention claimed is:

1. A method for quantum key distribution, QKD, applied to a QKD end-node, the method comprising:

locally generating a local key, and dividing the local key into a first local key part and a second local key part;

receiving, via a ground-based first path, remote key information including an encrypted remote key generated by a remote, further QKD end-node;

receiving, via a satellite-based second path, a first remote key part of the remote key;

performing decryption on the remote key information using the first remote key part to obtain a second remote key part of the remote key; and combining the second remote key part and the second local key part with each other to obtain a secret key.

2. The method of claim 1, wherein the secret key is provided to a local application for establishing secure communication to a corresponding remote application of the further QKD end-node using the secret key.

3. The method of claim 1, wherein the locally generating of the local key comprises:

generating the local key as a quantum key by using a local quantum channel with a QKD neighbor-node arranged adjacent to the QKD end-node in the first path;

wherein the QKD neighbor-node is different from the further end-node.

4. The method of claim 1, further comprising:

performing encryption on the first local key part and the second local key part to obtain local key information including an encrypted local key; and providing the local key information via the first path.

5. The method of claim 4, wherein the local key information is provided via a classical channel of the first path.

6. The method of claim 1, further comprising:

providing the first local key part via the second path.

7. The method of claim 6, wherein the first local key part is provided via a classical channel of the second path.

8. The method of claim 6, further comprising:

performing encryption on the first local key part and the second local key part to obtain local key information including an encrypted local key; and providing the local key information via the first path, wherein the first local key part is provided after elapse of a random interval of time from or after providing the local key information.

9. A method for quantum key distribution, QKD, applied to a QKD network comprising a first QKD end-node and a second QKD end-node arranged remotely from the first QKD end-node, the method comprising:

obtaining, by the first QKD end-node, a secret key by carrying out the method of claim 1, wherein the first QKD end-node acts as the QKD end-node and the second QKD end-node acts as the remote QKD end-node; and obtaining, by the second QKD end-node, the secret key by carrying out the same method, wherein the second QKD end-node acts as the QKD end-node and the first QKD end-node acts as the remote QKD end-node.

10. A quantum key distribution, QKD, end-node comprising:

a first interface circuitry configured to receive, via a ground-based first path, a remote key information including an encrypted remote key generated by a remote, further QKD end-node;

a second interface circuitry configured to receive, via a satellite-based second path, a first remote key part of the remote key; and processing circuitry configured to:

locally generate a local key, and divide the local key into a first local key part and a second local key part; and perform decryption on the remote key information using the first remote key part to obtain a second remote key part of the remote key; and combine the second remote key part and the second local key part with each other to obtain a secret key.

11. A quantum key distribution, QKD, network, comprising:

two QKD end-nodes according to claim 10, referred to respectively as a first QKD end-node and a second QKD end-node, the second QKD end-node arranged remotely from the first QKD end-node;

a first QKD neighbor-node arranged in the first path adjacent and connected to the first QKD end-node; and a second QKD neighbor-node arranged in the first path adjacent and connected to the second QKD end-node;

wherein the first QKD neighbor-node and the second QKD neighbor-node each have a respective quantum channel with the respective first QKD neighbor-node or second QKD neighbor-node to generate the respective local key.

12. The QKD network of claim 11, further comprising:

a plurality of QKD or non-QKD intermediate-nodes successively arranged along the first path between the first QKD neighbor-node and the second QKD neighbor-node;

wherein each of the plurality of QKD or non-QKD intermediate-nodes is configured to pass on the remote key information, or local key information, or both to a next one of a number of QKD or non-QKD intermediate-nodes towards the respective first QKD end-node or second QKD end-node via a classical channel.

13. The QKD network of claim 11, wherein each of the number of QKD or non-QKD intermediate-nodes, or at least one QKD neighbor-node, or both are configured to individually decrypt and encrypt the remote key information, or local key information, or both and pass said information on along the first path.

14. The method according to claim 1, further comprising:

establishing a secure end-to-end communication between two QKD end-nodes using the secret key.

15. A non-transitory computer-readable medium storing a computer program comprising instructions to cause processing circuitry of a quantum key distribution, QKD, end-node to carry out the method according to claim 1.

* * * * *